May 27, 1952 — J. F. AHLGRIM — 2,598,091
CUTTING DISK FOR LAWN MOWERS
Filed Oct. 6, 1949
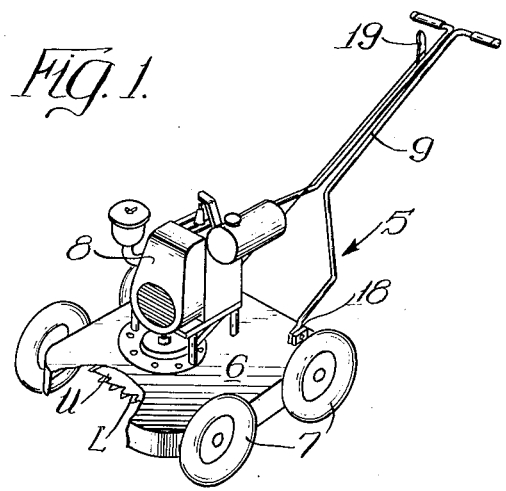
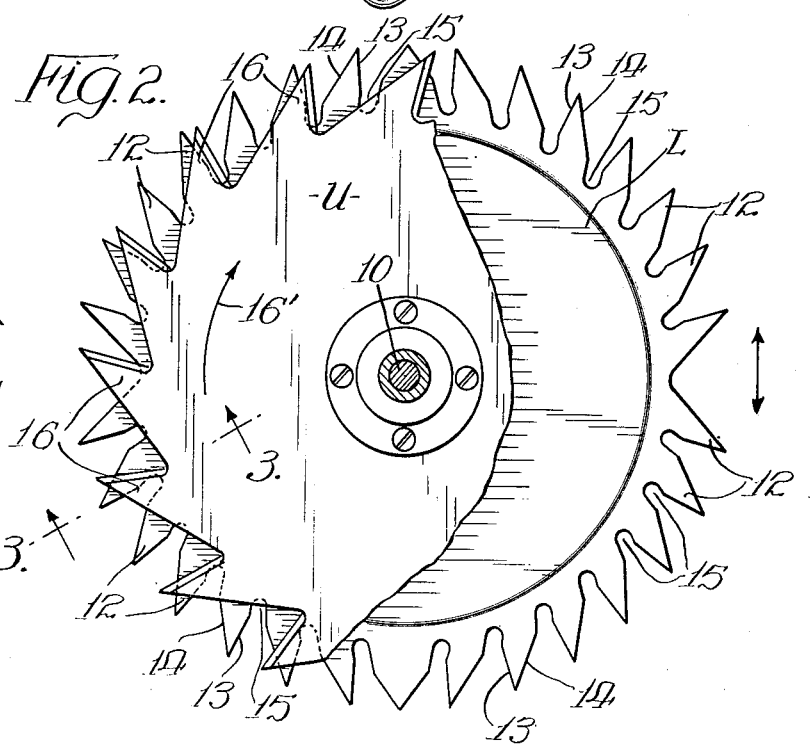
INVENTOR.
John F. Ahlgrim Patented May 27, 1952

2,598,091

UNITED STATES PATENT OFFICE 2,598,091

CUTTING DISK FOR LAWN MOWERS

John F. Ahlgrim, Palatine, Ill.

Application October 6, 1949, Serial No. 119,880

2 Claims. (Cl. 56—295)

The main objects of this invention are to provide an improved form and arrangement of cutting blades for a lawnmower; to provide an improved form and arrangement of a pair of relatively rotatable, toothed discs for more effectively shearing of all blades and stalks of grass or vegetation within the path of advancing lawnmower; and to provide such an improved form and arrangement of toothed discs particularly suitable for use on a powered lawnmower.

In the accompanying drawings:

Figure 1 is a perspective view of a motor-driven lawnmower equipped with cutting discs embodying this invention;

Fig. 2 is an enlarged plan view of the associated discs, a part of the upper one being broken away to more clearly indicate the construction of the lower disc; and Fig. 3 is a fragmentary transverse sectional view of the superimposed discs, taken on line 3—3 of Fig. 2.

A lawnmower 5 wherewith the present upper and lower discs U and L, respectively, are particularly designed for use, is herein shown to comprise a frame having a base 6 movable upon the usual wheels 7. Upon the base is mounted a motor 8 and connected thereto is an operating handle 9.

The discs U and L are preferably made from high grade tool steel. The lower disc L serves as a gathering disc, its purpose being to draw inwardly and hold upright the encountered blades or stalks to better insure their clean-cut shearing by the upper or cutting disc U. The gathering disc L is fixedly secured to a suitable cross piece (not shown) on the under side of the base 6, whereas the cutting disc U is mounted to rotate with a shaft 10 in response to power transmitted thereto from the motor 8.

The teeth 12 are V-shaped and on the front half of the gathering disc L are inclined forwardly in the normal operating direction of travel of the mower, whereas the teeth on the rear half are oppositely inclined in a rearward direction. As will be noted from Fig. 2, the teeth 12 at diametrically opposite points forwardly and rearwardly are radially disposed with respect to the gathering disc. The other teeth 12, intermediate the diametrically-opposed middle teeth and the transverse diameter normal to the diameter of said middle teeth, are all inclined with respect to a radius passing through each of the respective teeth. As a matter of fact, the inclination of the teeth in each quadrant is such that lines bisecting the respective teeth of each quadrant converge inwardly toward a point intermediate the axis of the gathering disc and the perimeter thereof and somewhat rearwardly of said normal diameter. Being so formed, the advancing edge 13 of each tooth 12 with respect to the direction of travel of the lawnmower is disposed approximately radially of the disc with the trailing edge 14 of each tooth 12 inclined outwardly toward the periphery of the disc teeth 12. In this particular embodiment, each of the teeth 12, inwardly of the base of a triangle formed by the edges 13 and 14 and an arc of the circumference defining their inner ends, is formed with its sides substantially parallel with a line bisecting the angle of the respective tooth for a predetermined distance further inwardly from said circumference where the sides of adjacent teeth merge into a common arc. The space between the teeth 12 provides pockets 15 into which the encountered blades and stalks are gathered and held erect and firm during the cutting operation.

The upper face of the gathering disc L which is hollow ground from a point slightly in from the base of the teeth 12 (see Fig. 3) is engaged with the under face of the cutting disc U throughout the area of the annulus to the outside of the central hollow ground area, and nowhere else. This assures a minimum of friction, and avoidance of any space intervening between the discs in their cutting area.

The cutting disc U has its teeth 16 formed very much like a circular rip saw. The pitch of all the teeth 16 is in the direction of the rotation, as indicated by the arrow 16' in Fig. 2. The cutting edge of each tooth 16 is slightly inclined inwardly of the radial line extending through the point of the respective tooth and is beveled, as clearly shown in Fig. 2. The diameter of the cutting disc U, as will be noted from Fig. 2, is very slightly less than the diameter of the gathering disc L, the latter thereby being effective to move radially inwardly into position to cut the blades and stalks which are encountered during movement of the mower over the ground.

The motor 8 may be of any suitable type, the one herein shown being a gasoline motor. The handle 11 is swingably attached to lugs 18 on the base 6 and mounts a control lever 19 for the motor 8.

In operation, the lawnmower moves forwardly and the blades and stalks within the swath measured by the tips of the most rearward teeth 12 on the gathering disc L will be gathered into the pockets 15 between the teeth and held firm and erect against the trailing edges of the teeth as the cutting disc U moves the cutting edges of the teeth 16 toward the trailing edges of the teeth 12. The result is a clean, even-cut strand of grass. A similar result occurs if the mower move rearwardly to cut grass.

When sharpening of the teeth on the cutting disc U is needed the discs may be conveniently removed from their mountings.

Variations and modifications in the details of structure and arrangement may be resorted to within the spirit and coverage of the appended claims.

I claim:

1. In a traveling lawnmower of the type which utilizes a fixed circular toothed disc coacting with a rotatable circular toothed disc thereabove and in concentric engaging relation therewith, the feature of improvement which consists in that each tooth of the lower disc, through the leading 180° of its periphery, has opposite sides converging to a point, and the contour of all the said teeth varying symmetrically, but reversely, in the two quadrants on opposite sides of a diameter of the disc that is coincident with the line of mower travel to dispose one converging side of each substantially radially of the disc.

2. A lawnmower according to claim 1 in which the confronting sides of adjacent teeth are disposed substantially parallel for a limited distance outwardly from their bases to provide therebetween gathering pockets wherein blades are supported when mowed.

JOHN F. AHLGRIM.

REFERENCES CITED

The following references are of record in the file of this patent:

UNITED STATES PATENTS

| Number | Name | Date |
|---|---|---|
| 1,221,204 | Montague | Apr. 3, 1917 |
| 1,715,675 | Rades | June 4, 1929 |
| 2,172,786 | Bishir | Sept. 12, 1939 |
| 2,225,239 | Urschel | Dec. 17, 1940 |
| 2,403,236 | Phelps | July 2, 1946 |
| 2,485,729 | Gentry | Oct. 25, 1949 |
| 2,506,215 | Hays | May 3, 1950 |
| 2,527,472 | Wolf | Oct. 24, 1950 |